United States Patent
Hamada

(10) Patent No.: US 7,862,186 B2
(45) Date of Patent: Jan. 4, 2011

(54) PROJECTOR

(75) Inventor: Shingo Hamada, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 507 days.

(21) Appl. No.: 11/876,823

(22) Filed: Oct. 23, 2007

(65) Prior Publication Data

US 2008/0117389 A1     May 22, 2008

(30) Foreign Application Priority Data

Nov. 22, 2006    (JP)   ............... 2006-314923

(51) Int. Cl.
    *G03B 21/14*      (2006.01)
(52) U.S. Cl. ............... 353/119; 353/52; 353/55; 353/57; 353/60; 353/61; 353/122; 313/623; 313/634; 313/609; 313/637; 313/113; 362/561; 362/614; 362/615; 345/60
(58) Field of Classification Search ............ 353/57, 353/60, 61, 119, 52, 55, 56, 122; 313/623, 313/634, 609, 637, 113; 345/60
See application file for complete search history.

(56) References Cited

U.S. PATENT DOCUMENTS

| | | | | |
|---|---|---|---|---|
| 4,824,239 | A * | 4/1989 | Sekine | 353/66 |
| 6,494,581 | B2 * | 12/2002 | Shimizu | 353/61 |
| 7,222,970 | B2 | 5/2007 | Yamada et al. | |
| 7,364,308 | B2 | 4/2008 | Murasugi | |
| 2003/0071977 | A1 * | 4/2003 | Miyamoto et al. | 353/52 |
| 2004/0169825 | A1 * | 9/2004 | Ozawa et al. | 353/61 |
| 2004/0233399 | A1 | 11/2004 | Katsuma et al. | |
| 2005/0264766 | A1 * | 12/2005 | Morimoto et al. | 353/61 |
| 2006/0170876 | A1 * | 8/2006 | Takemi et al. | 353/61 |
| 2006/0209544 | A1 | 9/2006 | Nishikawa et al. | |

(Continued)

FOREIGN PATENT DOCUMENTS

JP      62-171821 U      10/1987

(Continued)

OTHER PUBLICATIONS

Japanese Office Action dated Nov. 11, 2008 w/English translation (four (4) pages).

(Continued)

*Primary Examiner*—Georgia Y Epps
*Assistant Examiner*—Sultan Chowdhury
(74) *Attorney, Agent, or Firm*—Crowell & Moring LLP

(57) ABSTRACT

This projector comprises a source lamp, a lamp storage portion, storing the source lamp therein, including an air discharge opening for discharging internal air from the lamp storage portion and a netlike member so arranged as to cover the outer side of the air discharge opening of the lamp storage portion for inhibiting fragments of the source lamp from being discharged outward from the lamp storage portion through the air discharge opening when the source lamp is broken. The lamp storage portion further includes a protrusion provided on the outer side surface close to the air discharge opening to protrude in a direction intersecting with the extensional direction of the netlike member with a function of inhibiting the fragments of the source lamp from passing through a clearance between the lamp storage portion and the netlike member.

16 Claims, 7 Drawing Sheets

U.S. PATENT DOCUMENTS

2010/0033688 A1 * 2/2010 Obama et al. .................. 353/61

FOREIGN PATENT DOCUMENTS

| | | |
|---|---|---|
| JP | 3-186124 A | 8/1991 |
| JP | 2002-216536 A | 8/2002 |
| JP | 2003-007128 A | 1/2003 |
| JP | 2003-24729 A | 1/2003 |
| JP | 2004-71498 A | 3/2004 |
| JP | 2004-109781 A | 4/2004 |
| JP | 2005-316177 A | 11/2005 |
| JP | 2006-84589 A | 3/2006 |
| JP | 2006-259027 A | 9/2006 |
| WO | WO 2006/078058 A2 | 7/2006 |

OTHER PUBLICATIONS

European Search Report dated Feb. 23, 2010 (six (6) pages).

* cited by examiner

PROJECTOR

BACKGROUND OF THE INVENTION

1. Field of the Invention

The present invention relates to a projector, and more particularly, it relates to a projector comprising a source lamp and a lamp storage portion.

2. Description of the Background Art

A projector comprising a source lamp and a lamp storage portion is known in general, as disclosed in Japanese Patent Laying-Open Nos. 2005-316177 and 2003-7128, for example.

The aforementioned Japanese Patent Laying-Open No. 2005-316177 discloses a protrusion display (projector) comprising a source lamp, a case-shaped lamp unit (lamp storage portion), storing the source lamp, having an opening serving as an air outlet and a mesh net arranged on the opening of the lamp unit. The mesh net is mounted in the case-shaped lamp unit on a prescribed position close to the opening.

The aforementioned Japanese Patent Laying-Open No. 2003-7128 discloses a light source unit, employed for a liquid crystal projector, comprising a heat-resistant organic material cover so formed as to cover a discharge lamp by bonding a plurality of films or nets of a heat-resistant organic material to each other and an outer frame in which the discharge lamp covered with the heat-resistant organic material cover and the heat-resistant organic material cover are arranged.

In the protrusion display (projector) disclosed in the aforementioned Japanese Patent Laying-Open No. 2005-316177, however, the mesh net is mounted in the case-shaped lamp unit on the prescribed position close to the opening, whereby the operation of arranging the mesh net on the prescribed position in the lamp unit is disadvantageously complicated. In other words, assembling workability for mounting the mesh net is deteriorated.

In the light source unit employed for a liquid crystal projector disclosed in the aforementioned Japanese Patent Laying-Open No. 2003-7128, the portions of the heat-resistant organic material cover where the films or nets of the heat-resistant organic material are bonded to each other may be deteriorated by heat applied from the discharge lamp and with age. Thus, the portions of the heat-resistant organic material cover where the films or nets of the heat-resistant organic material are bonded to each other may disadvantageously separate from each other. If the discharge lamp (source lamp) is broken in such a state that the portions of the heat-resistant organic material cover where the films or nets of the heat-resistant organic material are bonded to each other separate from each other, fragments of the discharge lamp disadvantageously pass through the separating portions of the heat-resistant organic material cover where the films or nets of the heat-resistant organic material have been bonded to each other and scatter outward from the heat-resistant organic material cover and the liquid projector.

SUMMARY OF THE INVENTION

The present invention has been proposed in order to solve the aforementioned problems, and an object of the present invention is to provide a projector capable of improving assembling workability while inhibiting fragments of a source lamp from scattering outward from a lamp storage portion when the source lamp is broken.

In order to attain the aforementioned object, a projector according to a first aspect of the present invention comprises a source lamp, a lamp storage portion, storing the source lamp therein, including an air discharge opening for discharging internal air from the lamp storage portion and a netlike member, so arranged as to cover the outer side of the air discharge opening of the lamp storage portion, having a function of passing air therethrough and inhibiting fragments of the source lamp from being discharged outward from the lamp storage portion through the air discharge opening when the source lamp is broken, while the lamp storage portion further includes a protrusion provided on the outer side surface close to the air discharge opening to protrude in a direction intersecting with the extensional direction of the netlike member with a function of inhibiting the fragments of the source lamp from passing through a clearance between the lamp storage portion and the netlike member.

In the projector according to the first aspect, as hereinabove described, the netlike member inhibiting the fragments of the source lamp from being discharged outward from the lamp storage portion through the air discharge opening when the source lamp is broken is so arranged as to cover the outer side of the air discharge opening of the lamp storage portion so that the netlike member can be mounted from the outer side of the lamp storage portion dissimilarly to a case of arranging the netlike member to cover the inner side of the air discharge opening of the lamp storage portion, whereby assembling workability for mounting the netlike member can be improved. Further, the protrusion having the function of inhibiting the fragments of the source lamp from passing through the clearance between the lamp storage portion and the netlike member is provided on the outer side surface close to the air discharge opening to protrude in the direction intersecting with the extensional direction of the netlike member so that the fragments of the source lamp can collide with the protrusion protruding in the direction intersecting with the extensional direction of the netlike member even if the fragments of the source lamp pass through the clearance between the outer side surface of the lamp storage portion and the netlike member when the source lamp is broken while the clearance is formed between the outer side surface of the lamp storage portion and the netlike member, whereby the fragments of the source lamp can be inhibited from scattering outward from the lamp storage portion.

In the aforementioned projector according to the first aspect, the protrusion is preferably formed at least on a region corresponding to the air discharge opening. According to this structure, fragments of the source lamp discharged through the air discharge opening can collide with the protrusion when the source lamp is broken.

The aforementioned projector according to the first aspect preferably further comprises a holding member mounted on a position corresponding to the air discharge opening of the lamp storage portion to hold the netlike member between the same and the outer side surface of the lamp storage portion. According to this structure, the holding member can hold the netlike member to press the same against the outer side surface of the lamp storage portion, thereby inhibiting the netlike member from slipping off the outer side surface of the lamp storage portion.

In the projector comprising the aforementioned holding member, the holding member preferably includes an engaging portion, and the lamp storage portion preferably further includes an engaging hole engaging with the engaging portion of the holding member. According to this structure, the holding member can be easily mounted on a prescribed position of the lamp storage portion.

In the projector comprising the aforementioned holding member, the protrusion is preferably so provided as to hold both sides of the holding member and to function as a guide for mounting the holding member. According to this structure, the holding member can be easily mounted on a prescribed position of the outer side surface of the lamp storage portion.

In the projector comprising the aforementioned holding member, a plurality of protrusions are preferably provided, and at least one of the plurality of protrusions is preferably so provided as to incline toward the outer side surface of a portion of the lamp storage portion where the holding member is arranged. According to this structure, the inclining protrusion can cover a portion of the holding member closer to the protrusion, thereby inhibiting the portion of the holding member closer to the protrusion from separating from the outer side surface of the lamp storage portion. Thus, the netlike member arranged between the outer side surface of the lamp storage portion and the holding member can be inhibited from separating from the outer side surface of the lamp storage portion, whereby formation of a clearance between the netlike member and the outer side surface of the lamp storage portion can be suppressed. Consequently, the fragments of the source lamp can be more inhibited from scattering outward from the lamp storage portion when the source lamp is broken.

In the projector comprising the aforementioned holding member, the holding member preferably further includes an opening provided on a position corresponding to the air discharge opening of the lamp storage portion. According to this structure, hindrance to the flow of air discharged from the lamp storage portion can be suppressed.

In the projector comprising the aforementioned holding member, the lamp storage portion preferably further includes a supporting portion provided on the outer side surface close to the air discharge opening to protrude in a direction intersecting with the extensional direction of the netlike member, and the holding member preferably further includes a mounting portion formed on a position corresponding to the supporting portion of the lamp storage portion. According to this structure, the holding member can be easily arranged with respect to the lamp storage portion by arranging the mounting portion of the holding member to correspond to the supporting portion of the lamp storage portion.

In this case, the projector preferably further comprises a boss so provided as to protrude from the projector body, the supporting portion of the lamp storage portion preferably has a pair of first mounting holes, and the mounting portion of the holding member preferably has a pair of second mounting holes formed on positions corresponding to the pair of first mounting holes respectively, so that the boss is inserted into at least one of the pair of first mounting holes of the lamp storage portion and the second mounting hole formed on the position corresponding to at least one of the pair of first mounting holes. According to this structure, the lamp storage portion and the holding member can be located on a prescribed position with respect to the printer body with the boss.

In the aforementioned projector according to the first aspect, the netlike member is preferably fixed to the lamp storage portion with a double-faced adhesive tape. According to this structure, the netlike member can be fixed to the lamp storage portion not only with the holding member but also with the double-faced adhesive tape, whereby formation of a clearance between the netlike member and the outer side surface of the lamp storage portion can be further suppressed.

A projector according to a second aspect of the present invention comprises a source lamp, a lamp storage portion, storing the source lamp therein, including an air discharge opening for discharging internal air from the lamp storage portion, a netlike member, so arranged as to cover the outer side of the air discharge opening of the lamp storage portion, having a function of passing air therethrough and inhibiting fragments of the source lamp from being discharged outward from the lamp storage portion through the air discharge opening when the source lamp is broken and a holding member, mounted on a position corresponding to the air discharge opening of the lamp storage portion to hold the netlike member between the same and the outer side surface of the lamp storage portion, including an engaging portion, while the lamp storage portion further includes a plurality of protrusions provided on the outer side surface close to the air discharge opening to protrude in a direction intersecting with the extensional direction of the netlike member with a function of inhibiting the fragments of the source lamp from passing through a clearance between the lamp storage portion and the netlike member and an engaging hole engaging with the engaging portion of the holding member, the plurality of protrusions are so provided as to hold both sides of the holding member and to function as guides for mounting the holding member, and at least one of the plurality of protrusions is so provided as to incline toward the holding member with respect to the outer side surface of a portion of the lamp storage portion where the holding member is arranged.

In the projector according to the second aspect, as hereinabove described, the netlike member inhibiting the fragments of the source lamp from being discharged outward from the lamp storage portion through the air discharge opening when the source lamp is broken is so arranged as to cover the outer side of the air discharge opening of the lamp storage portion so that the netlike member can be mounted from the outer side of the lamp storage portion dissimilarly to a case of arranging the netlike member to cover the inner side of the air discharge opening of the lamp storage portion, whereby assembling workability for mounting the netlike member can be improved. Further, the holding member mounted on the position corresponding to the air discharge opening of the lamp storage portion to hold the netlike member between the same and the outer side surface of the lamp storage portion is so provided that the holding member can hold the netlike member to press the same against the outer side surface of the lamp storage portion, thereby inhibiting the netlike member from slipping off the outer side surface of the lamp storage portion. In addition, the plurality of protrusions having the function of inhibiting the fragments of the source lamp from passing through the clearance between the lamp storage portion and the netlike member are provided on the outer side surface close to the air discharge opening to protrude in the direction intersecting with the extensional direction of the netlike member so that the fragments of the source lamp can collide with the protrusions protruding in the direction intersecting with the extensional direction of the netlike member even if the fragments of the source lamp pass through the clearance between the outer side surface of the lamp storage portion and the netlike member when the source lamp is broken while the clearance is formed between the outer side surface of the lamp storage portion and the netlike member, whereby the fragments of the source lamp can be inhibited from scattering outward from the lamp storage portion. Further, the lamp storage portion is provided with the engaging hole engaging with the engaging portion of the holding member, whereby the holding member can be easily mounted on a prescribed position of the lamp storage portion.

In the projector according to the second aspect, further, the protrusions are so provided as to hold both sides of the holding member and to function as the guides for mounting the holding member, whereby the holding member can be easily mounted on a prescribed position of the outer side surface of the lamp storage portion. In addition, at least one of the plurality of protrusions is so provided as to incline toward the outer side surface of the portion of the lamp storage portion where the holding member is arranged so that the inclining protrusion can cover a portion of the holding member closer to the protrusion, thereby inhibiting the portion of the holding member closer to the protrusion from separating from the outer side surface of the lamp storage portion. Thus, the netlike member arranged between the outer side surface of the lamp storage portion and the holding member can be inhibited from separating from the outer side surface of the lamp storage portion, whereby formation of a clearance between the netlike member and the outer side surface of the lamp storage portion can be suppressed. Consequently, the fragments of the source lamp can be more inhibited from scattering outward from the lamp storage portion when the source lamp is broken.

In the aforementioned projector according to the second aspect, the protrusions are preferably formed at least on a region corresponding to the air discharge opening. According to this structure, fragments of the source lamp discharged through the air discharge opening can collide with the protrusions when the source lamp is broken.

In the aforementioned projector according to the second aspect, the holding member preferably further includes an opening provided on a position corresponding to the air discharge opening of the lamp storage portion. According to this structure, hindrance to the flow of air discharged from the lamp storage portion can be suppressed.

In the aforementioned projector according to the second aspect, the lamp storage portion preferably further includes a supporting portion provided on the outer side surface close to the air discharge opening to protrude in a direction intersecting with the extensional direction of the netlike member, and the holding member preferably further includes a mounting portion formed on a position corresponding to the supporting portion of the lamp storage portion. According to this structure, the holding member can be easily arranged with respect to the lamp storage portion by arranging the mounting portion of the holding member to correspond to the supporting portion of the lamp storage portion.

In this case, the projector preferably further comprises a boss so provided as to protrude from the projector body, the supporting portion of the lamp storage portion preferably has a pair of first mounting holes, and the mounting portion of the holding member preferably has a pair of second mounting holes formed on positions corresponding to the pair of first mounting holes respectively, so that the boss is inserted into at least one of the pair of first mounting holes of the lamp storage portion and the second mounting hole formed on the position corresponding to at least one of the pair of first mounting holes. According to this structure, the lamp storage portion and the holding member can be located on a prescribed position with respect to the printer body with the boss.

In the aforementioned projector according to the second aspect, the netlike member is preferably fixed to the lamp storage portion with a double-faced adhesive tape. According to this structure, the netlike member can be fixed to the lamp storage portion not only with the holding member but also with the double-faced adhesive tape, whereby formation of a clearance between the netlike member and the outer side surface of the lamp storage portion can be further suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structure of a projector according to the embodiment of the present invention is described with reference to FIGS. 1 to 8.

Figure 1:
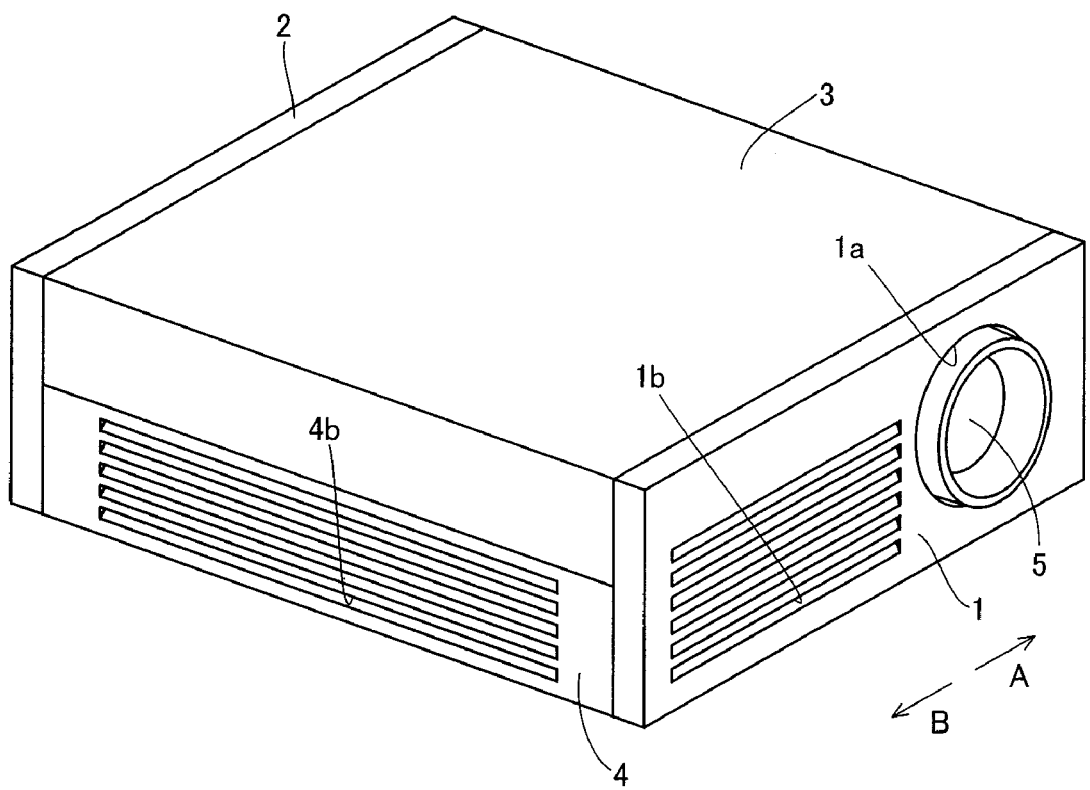
FIG. 1 is a perspective view showing the overall structure of a projector according to an embodiment of the present invention.

The projector according to the embodiment of the present invention comprises a front frame 1, a rear frame 2, an upper frame 3 and a lower frame 4, as shown in FIG. 1. The lower frame 4 is an example of the "projector body" in the present invention. A lens receiving portion 1a is provided on a part of the front frame 1 close to a first end (along arrow A), for receiving a projection lens 5 for projecting images. An exhaust port 1b is provided between the center and a second end (along arrow B) of the front frame 1, as shown in FIGS. 1 and 2.

Figure 2:
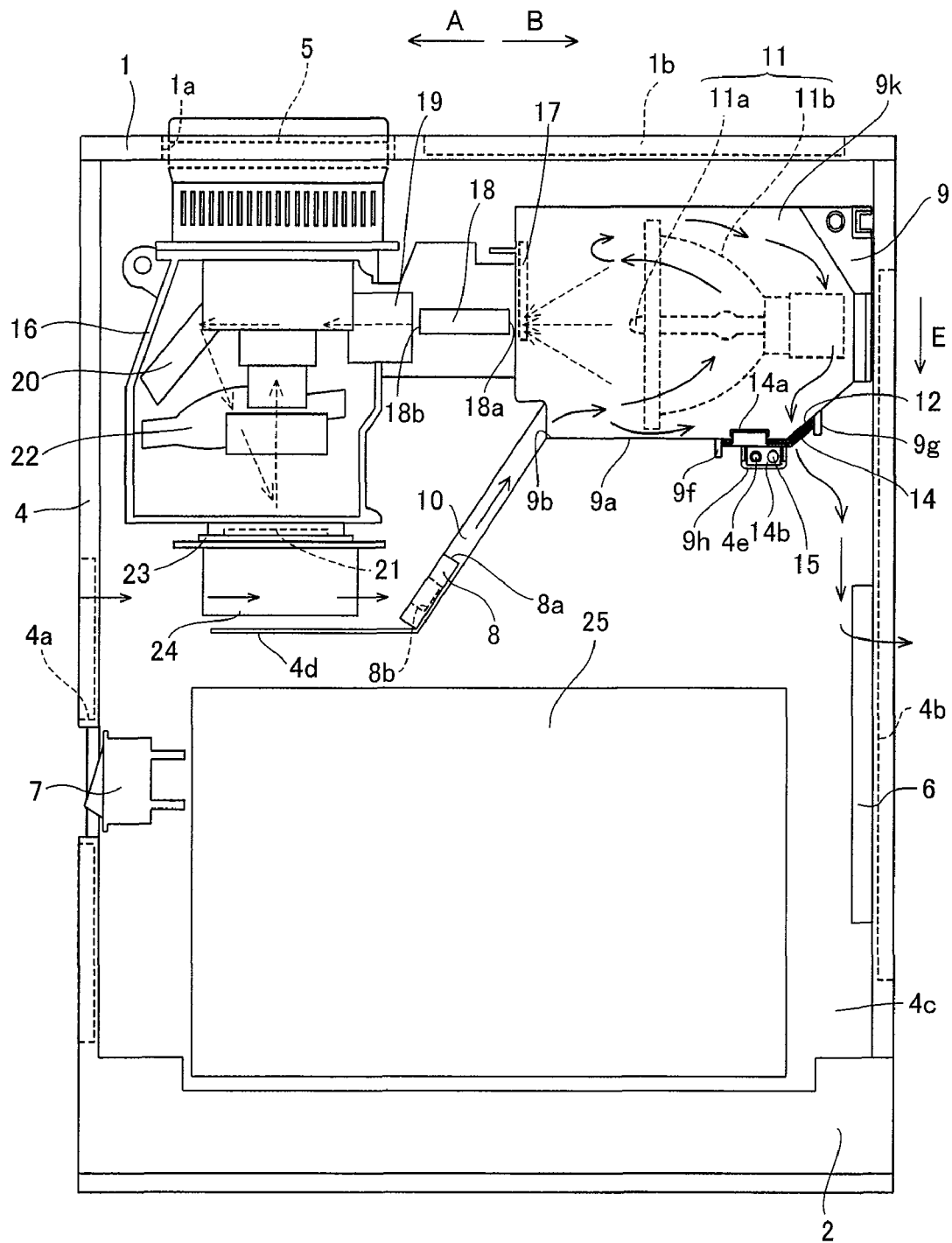
FIG. 2 is a plan view of the projector according to the embodiment of the present invention.

As shown in FIG. 2, a suction port 4a for introducing air and an outlet 4b for discharging air are formed on a first side surface (along arrow A) and a second side surface (along arrow B) of the lower frame 4 respectively. An exhaust fan 6 is arranged inside the outlet 4b for discharging internal air from the projector. Further, a main switch 7 is provided on the first side surface (along arrow A) of the lower frame 4.

A partition 4d is integrally provided on the lower frame 4, to extend upward from the bottom surface 4c of the lower frame 4. A blower 8 is arranged along the partition 4d. The partition 4d is so provided as to guide the air introduced through the suction port 4a to the blower 8. A duct 10 for guiding the air blown from the blower 8 to a lamp case 9 described later is arranged in an air vent 8a of the blower 8.

The blower 8 is provided with an air intake 8b for introducing the air. A plurality of vanes (not shown) are rotatably mounted on the air intake 8b. In other words, the blower 8 is so formed as to blow the air introduced through the air intake 8b due to rotation of the plurality of vanes (not shown).

Figure 3:
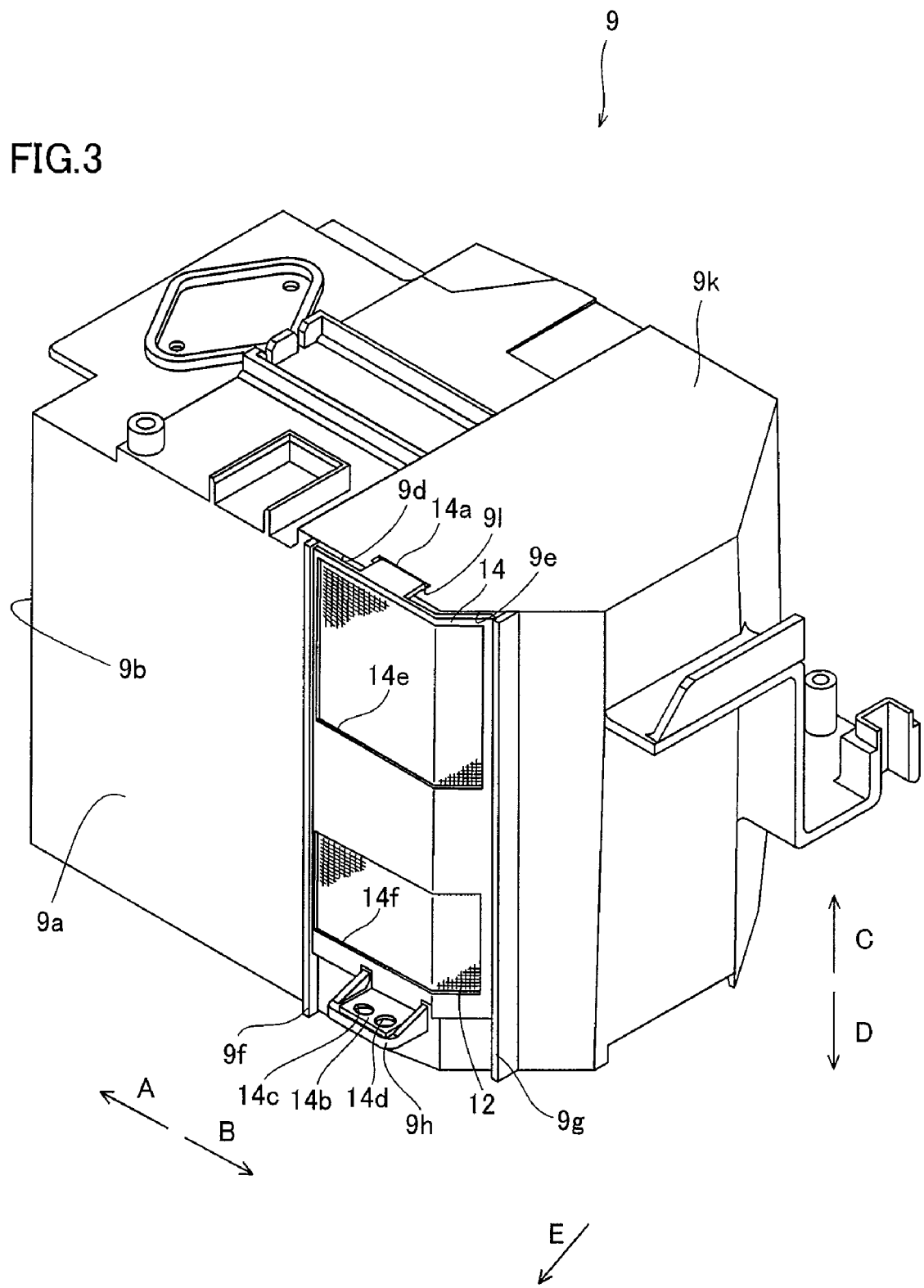
FIG. 3 is a perspective view showing a state where a net member and a holding plate are mounted on a lamp case of the projector according to the embodiment of the present invention shown in FIG. 1.

A source lamp 11 includes a glass bulb 11a serving as a light source and a metal reflector 11b for reflecting and condensing light emitted from the bulb 11a. This source lamp 11 is mounted in a lamp case 9. This lamp case 9 is made of PPS resin (polyphenylene sulfide resin) (heat-resistant temperature: about 240° C.). The lamp case 9 is an example of the "lamp storage portion" in the present invention. As shown in FIGS. 2 and 3, the lamp case 9 is so formed as to enclose the source lamp 11, in order to prevent leakage of the light (ultraviolet light) emitted from the source lamp 11. The lamp case 9 so encloses the source lamp 11 that fragments of the source lamp 11 can be inhibited from scattering outward when the source lamp 11 arranged in the lamp case 9 is broken due to excessive temperature rise or the like.

According to this embodiment, an inflow guide port 9b is provided on a first side surface 9a of the lamp case 9 along arrow A as shown in FIG. 2, in order to receive the air blown from the blower 8 through the duct 10. A plurality of discharge guide ports 9c (see FIG. 6) are provided on the first side surface 9a of the lamp case 9 along arrow B, in order to discharge the air guided to the rear portion of the source lamp 11. In other words, the lamp case 9 is so formed that the air introduced through the intake guide port 9b circulates in the lamp case 9, thereby cooling the source lamp 11. The discharge guide ports 9c are examples of the "air discharge opening" in the present invention. Further, the projector is so formed that the air cooling the source lamp 11 is discharged from the lamp case 9 through the plurality of discharge guide ports 9c (see FIG. 6) and thereafter discharged from the projector through the exhaust fan 6.

Figure 6:
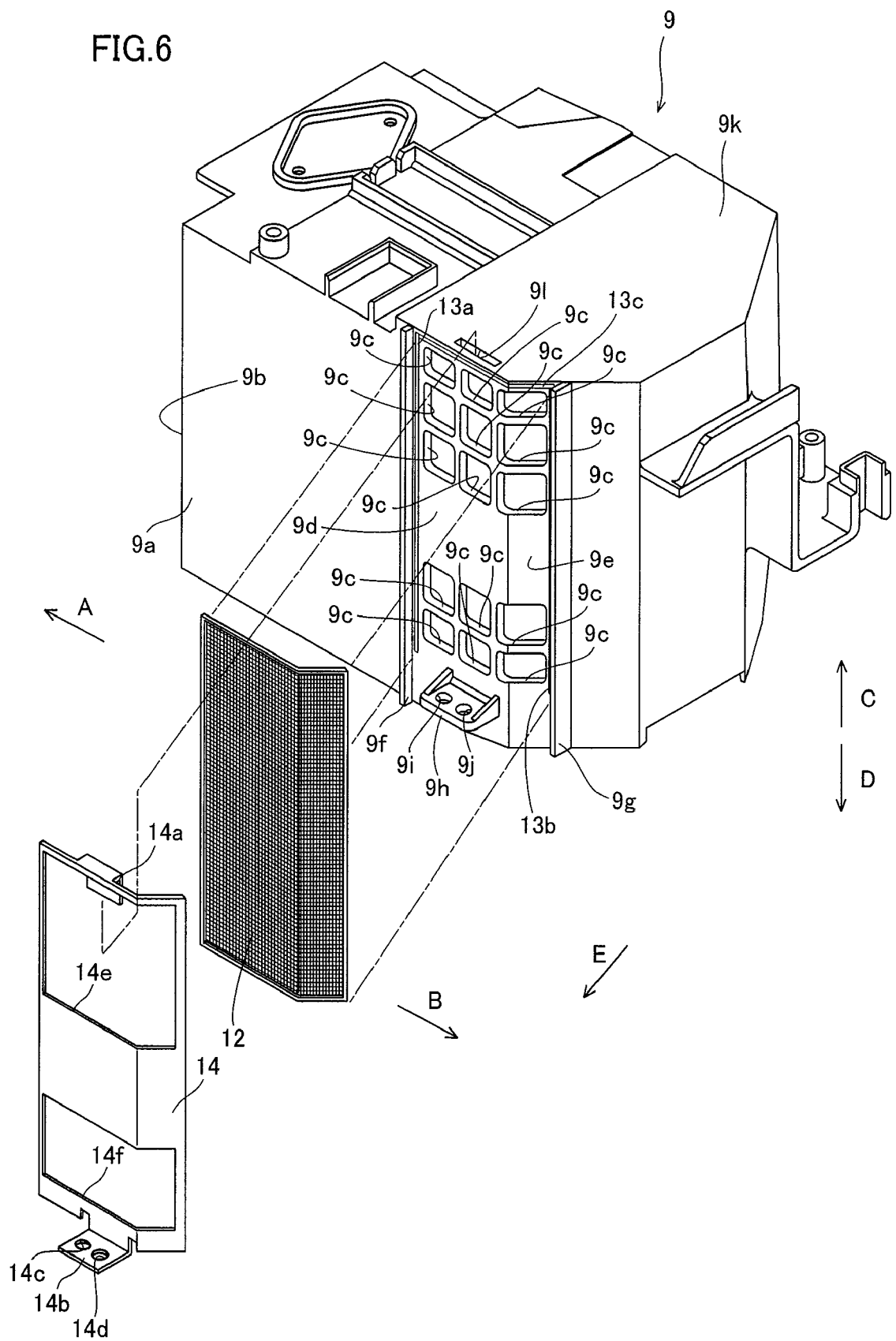
FIG. 6 is an exploded perspective view showing the position where the net member and the holding plate are mounted on the lamp case of the projector according to the embodiment of the present invention shown in FIG. 1.
Figure 7:
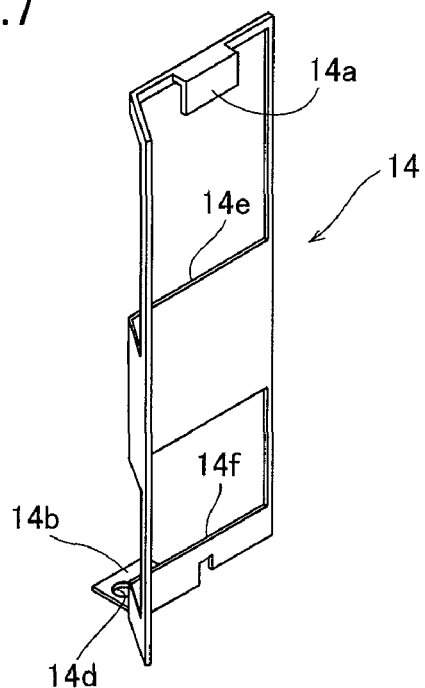
FIG. 7 is a perspective view showing the holding plate of the projector according to the embodiment of the present invention shown in FIG. 1.

According to this embodiment, a net member 12 is so arranged as to cover the outer sides of the discharge guide ports 9c (the outer side surface 9d and an inclining outer side surface 9e of the lamp case 9) provided on the first side surface 9a of the lamp case 9, as shown in FIGS. 3 and 6. More specifically, double-faced adhesive tapes 13a, 13b and 13c are stuck to the sides of the discharge guide ports 9c along arrows A, B and C respectively, and the net member 12 is mounted on these double-faced adhesive tapes 13a, 13b and 13c. In other words, the net member 12 is fixed to the outer side surfaces 9d and 9e of the lamp case 9 with the double-faced adhesive tapes 13a, 13b and 13c. The net member 12 is formed by weaving a wire of stainless steel into a mesh having a bore diameter of about 0.2 mm square. This net member 12 has a function of passing the air discharged from the plurality of discharge guide ports 9c therethrough, and a function of inhibiting fragments of the source lamp 11 from being discharged (scattered) from the lamp case 9 through the discharge guide ports 9c when the source lamp 11 is broken due to excessive temperature rise or the like. The net member 12 is an example of the "netlike member" in the present invention.

Figure 4:
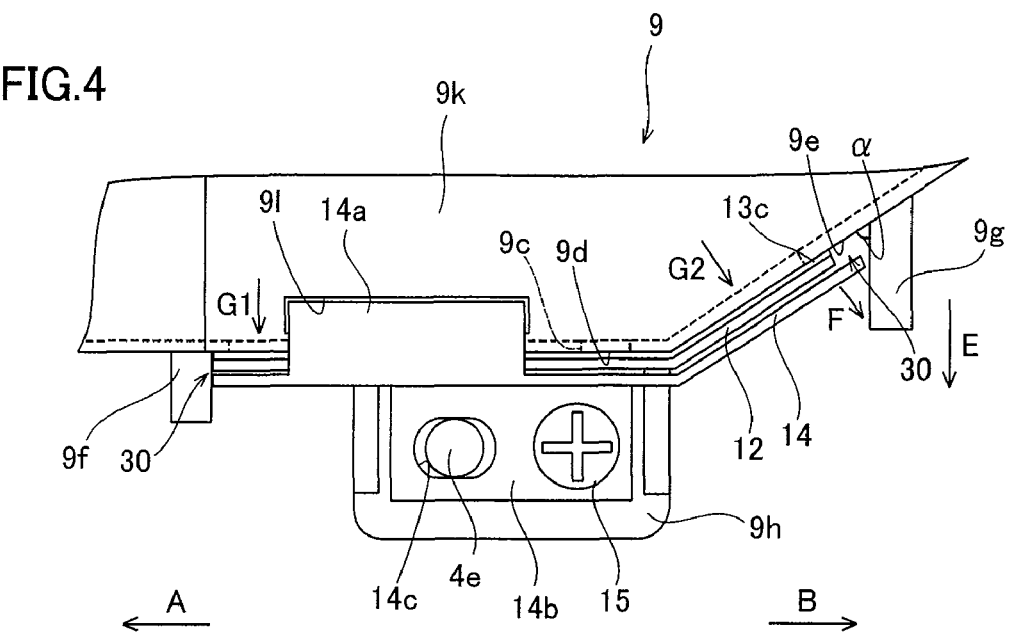
FIG. 4 is a plan view showing the state where the net member and the holding plate are mounted on the lamp case of the projector according to the embodiment of the present invention shown in FIG. 1.

According to this embodiment, a holding plate 14 is mounted on the outer side surface 9d and the inclining outer side surface 9e of the lamp case 9, to hold the net member 12 between the same and the outer side surface 9d and the inclining outer side surface 9e of the lamp case 9. The holding plate 14 is an example of the "holding member" in the present invention. This holding plate 14 has a shape corresponding to the outer side surface 9d and the inclining outer side surface 9e of the lamp case 9, and includes an engaging portion 14a and a lower engaging portion 14b for mounting the holding plate 14 on the lamp case 9, as shown in FIG. 4. The lower mounting portion 14b is arranged on a position corresponding to a plate supporting portion 9h of the lamp case 9 described later, and is provided with slitlike boss receiving holes 14c and 14d arranged on positions corresponding to a slitlike boss receiving hole 9i and a slitlike screw receiving hole 9j of the plate supporting portion 9h described later respectively. The lower mounting portion 14b is an example of the "mounting portion" in the present invention, and the boss receiving hole 14c and the screw receiving hole 14d are examples of the "second mounting hole" in the present invention. The holding plate 14 is further provided with an upper opening 14e and a lower opening 14f on positions corresponding to the discharge guide ports 9c of the lamp case 9. The upper and lower openings 14e and 14f are examples of the "opening" in the present invention. The holding plate 14 has a function of inhibiting the net member 12 from slipping off the outer side surface 9d and the inclining outer side surface 9e of the lamp case 9 when the double-faced adhesive tapes 13a, 13b and 13c sticking the net member 12 to the outer side surface 9d and the inclining outer side surface 9e of the lamp case 9 are deteriorated by heat and with age and the net member 12 separates from the outer side surface 9d and the inclining outer side surface 9e of the lamp case 9.

According to this embodiment, protrusions 9f and 9g are provided on the outer side surface 9d and the inclining outer side surface 9e of the lamp case 9 in the vicinity of the plurality of discharge guide ports 9c to protrude in a direction (along arrow E) perpendicular to the extensional directions (along arrows A, B, C and D) of the net member 12 and to hold both sides (along arrows A and B) of the holding plate 14 therebetween, as shown in FIGS. 4 and 6. More specifically, the protrusion 9f is provided on the side of the double-faced adhesive tape 13a along arrow A integrally with the outer side surface 9d of the lamp case 9, to extend in the vertical direction (along arrows C and D) in a riblike manner. Further, the protrusion 9f is so formed as to substantially perpendicularly protrude with respect to the outer side surface 9d. On the other hand, the protrusion 9g is provided on the side of the double-faced adhesive tape 13b along arrow B integrally with the inclining outer side surface 9e of the lamp case 9, to protrude with a prescribed sharp angle α (about 60°) with respect to the inclining outer side surface 9e and to extend in the vertical direction (along arrows C and D) in a riblike manner. The protrusions 9f and 9g are examples of the "protrusion" in the present invention. These protrusions 9f and 9g are so formed as to inhibit fragments of the source lamp 11 from passing through a clearance 30 (see FIG. 8) formed between the net member 12 and the outer side surface 9d and the inclining outer side surface 9e of the lamp case 9 when the source lamp 11 is broken while the double-faced adhesive tapes 13a, 13b and 13c are deteriorated by heat and with age and the net member 12 separates from the outer side surface 9d and the inclining outer side surface 9e of the lamp case 9. The protrusions 9f and 9g function as guides for mounting the holding plate 14 on the lamp case 9.

According to this embodiment, the protrusion 9g is formed substantially parallelly to the protrusion 9f, as shown in FIG. 4. In other words, the protrusions 9f and 9g are so provided as to hold both sides of the holding plate 14 therebetween, and function as the guides for mounting the holding plate 14. The protrusion 9g also has a function of inhibiting a portion of the holding plate 14 arranged closer to the discharge guide ports 9c (along arrow A) than the protrusion 9g from moving in a direction (along arrow F) for separating from the inclining outer side surface 9e.

Figure 5:
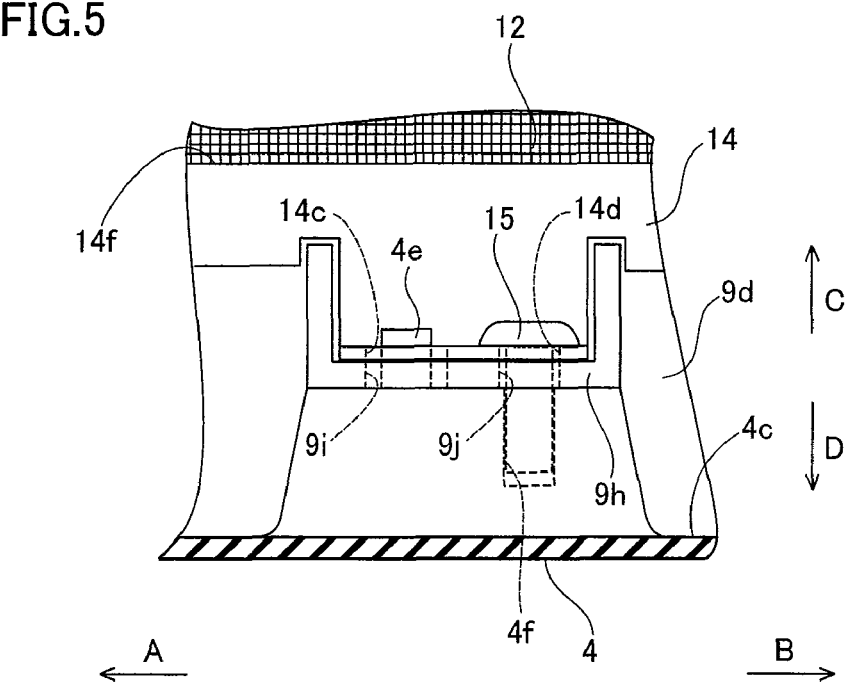
FIG. 5 is a front elevational view showing the state where the net member and the holding plate are mounted on the lamp case of the projector according to the embodiment of the present invention shown in FIG. 1.

As shown in FIGS. 5 and 6, the plate supporting portion 9h supporting the holding plate 14 is formed integrally on the outer side surface 9d under (along arrow D) a portion of the outer side surface 9d of the lamp case 9 mounted with the net member 12. More specifically, the plate supporting portion 9h is provided on the outer side surface 9d close to the discharge guide ports 9c to protrude in the direction intersecting with (perpendicular to) the extensional directions of the net member 12. The plate supporting portion 9h is an example of the "supporting portion" in the present invention. The plate supporting portion 9h is provided with the slitlike boss receiving hole 9i and the slitlike screw receiving hole 9j, as shown in FIG. 5. The boss receiving hole 9i and the screw receiving hole 9j are examples of the "first mounting hole" in the present invention. The boss receiving hole 9i is so formed as to correspond to the boss receiving hole 14c of the holding plate 14, for receiving a boss 4e (see FIG. 5) so provided as to protrude from the lower frame 4 along with the boss receiving hole 14c. The screw receiving hole 9j is formed on a position corresponding to the screw receiving hole 14d of the holding plate 14. A screw 15 is inserted into the screw receiving holes 14d and 9j, and fixed to a threaded hole 4f (see FIG. 5) of the lower frame 4. In other words, the plate supporting portion 9h of the lamp case 9 and the lower mounting portion 14b of the holding plate 14 are fixed to the lower frame 4. Thus, the lower portion of the holding plate 14 is inhibited from moving along arrow E with respect to the lamp case 9.

According to this embodiment, a rectangular engaging hole 91 is formed on a side of the upper surface 9k of the lamp case 9 closer to the outer side surface 9d (along arrow E) to extend along arrows A and B, as shown in FIG. 6. The engaging portion 14a of the holding plate 14 engages with this engaging hole 91. Thus, the upper portion of the holding plate 14 is inhibited from moving along arrow E with respect to the lamp case 9.

A casting 16 of magnesium (Mg) is set on the lower frame 4, as shown in FIG. 2. A color wheel 17 is rotatably arranged on a position of the casting 16 condensing the light emitted from the bulb 11a of the source lamp 11. This color wheel 17 has a function of coloring the light applied from the source lamp 11. A light tunnel 18 for rectangularly shaping the light is mounted on the side of the color wheel 17 along arrow A. This light tunnel 18, having an inlet 18a receiving the light from the source lamp 11 and an outlet 18b discharging the received light, is in the form of a tubular tetrahedron.

On the side of the outlet 18b of the light tunnel 18, a transmission member 19 transmitting the light shaped through the light tunnel 18 is mounted on the casting 16. A mirror 20 for reflecting the light transmitted through the transmission member 19 is set on the casting 16. A DMD element 21 for further reflecting the light reflected by the mirror 20 and supplying the same to the projection lens 5 is provided on the outer side of the casting 16. This DMD element 21 has a large number of reflecting portions on the surface thereof, for displacing these reflecting portions in response to image signals and forming images in response to presence/absence of reflected light. A lens 22 is provided between the DMD element 21 and the mirror 20. This lens 22 has a function of condensing the light reflected by the mirror 20 on the reflecting portions of the DMD element 21. The DMD element 21 is mounted on a printed board 23 for controlling the DMD element 21. A heat sink member 24 for radiating heat from the DMD element 21 is mounted on this printed board 23. A main board 25 for controlling the projector is arranged on the lower frame 4.

Figure 8:
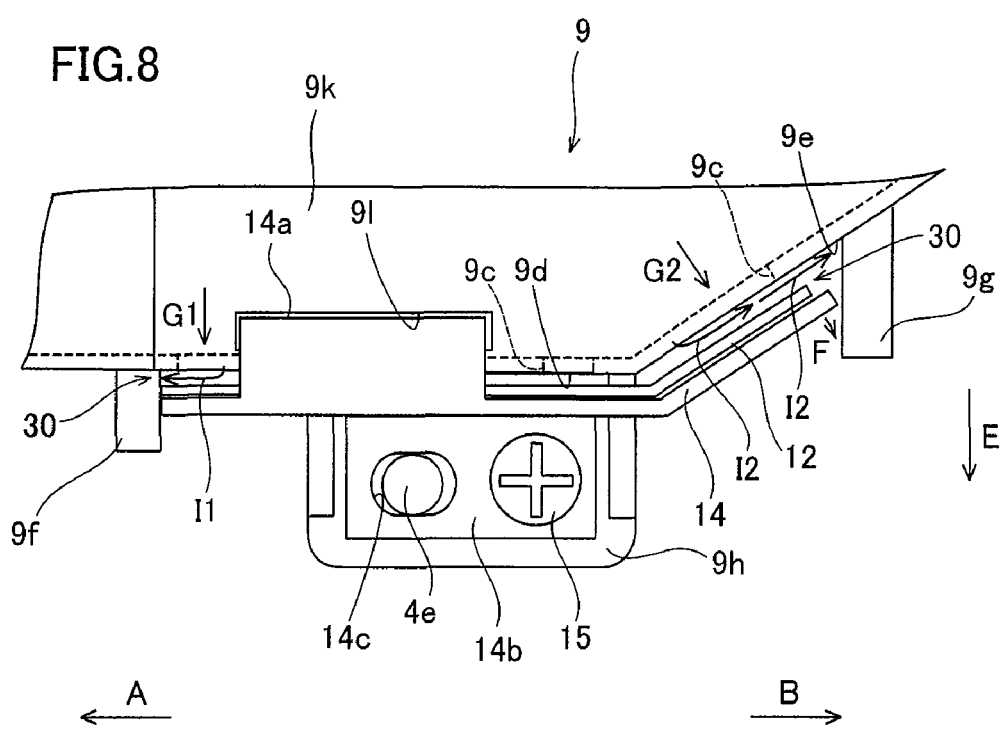
FIG. 8 is a plan view showing the net member separating from the outer side surface of the lamp case in the projector according to the embodiment of the present invention shown in FIG. 1.

Scattering of fragments of the source lamp 11 in the case where the source lamp 11 of the projector according to the embodiment of the present invention is broken is now described with reference to FIGS. 2, 4 and 8.

First, the case where the space between the net member 12 and the outer side surface 9d and the inclining outer side surface 9e is sealed with the double-faced adhesive tapes 13a, 13b and 13c is described.

If the bulb 11a of the source lamp 11 mounted in the lamp case 9 as shown in FIG. 2 is broken due to excessive temperature rise in the source lamp 11, fragments of the source lamp 11 scatter in all directions from the portion where the source lamp 11 has been arranged in the lamp case 9. Thereafter the scattering fragments of the source lamp 11 are partially moved toward the discharge guide ports 9c (along arrows G1 and G2) by the air guided through the duct 10 (see FIG. 2), as shown in FIG. 4. Then, the fragments of the source lamp 11 are moved to the portion where the net member 12 is arranged. At this time, the fragments of the source lamp 11 do not pas through the space between the net member 12 and the outer side surface 9d and the inclining outer side surface 9e, since the space between the net member 12 and the outer side surface 9d and the inclining outer side surface 9e is sealed with the double-faced adhesive tapes 13a, 13b and 13c. Further, the fragments of the source lamp 11 are inhibited from passing through the mesh of the net member 12 having the bore diameter of about 0.2 mm square. Thus, the fragments of the source lamp 11 can be inhibited from scattering outward from the lamp case 9.

A case where the double-faced adhesive tapes 13a, 13b and 13c so stuck as to seal the space between the net member 12 and the outer side surface 9d and the inclining outer side surface 9e are deteriorated by the heat of the source lamp 11 and with age to fail in sealing the space between the net member 12 and the outer side surface 9d and the inclining outer side surface 9e is now described.

When the bulb 11a of the source lamp 11 mounted in the lamp case 9 as shown in FIG. 2 is broken due to excessive temperature rise in the source lamp 11, fragments of the source lamp 11 scatter in all directions from the portion where the source lamp 11 has been arranged in the lamp case 9. Thereafter the scattering fragments of the source lamp 11 are partially moved toward the discharge guide ports 9c (along arrows G1 and G2) by the air guided through the duct 10 (see FIG. 2), as shown in FIG. 8. Then, the fragments of the source lamp 11 are moved to the portion where the net member 12 is arranged. At this time, the fragments of the source lamp 11 are moved between the net member 12 and the outer side surface 9d and the inclining outer side surface 9e along arrows I1 and I2, since the space between the net member 12 and the outer side surface 9d and the inclining outer side surface 9e is not sealed dissimilarly to the aforementioned case where the space between the net member 12 and the outer side surface 9d and the inclining outer side surface 9e is sealed. The fragments of the source lamp 11 moved along arrows I1 and I2 collide with the protrusions 9f and 9g respectively. Thus, the scattering fragments of the source lamp 11 are reduced in force, whereby these fragments can be inhibited from scattering outward from the lamp case 9.

Steps of mounting the net member 12 and the holding plate 14 on the lamp case 9 of the projector according to the embodiment of the present invention are now described with reference to FIGS. 3 to 6, 9 and 10.

Figure 9:
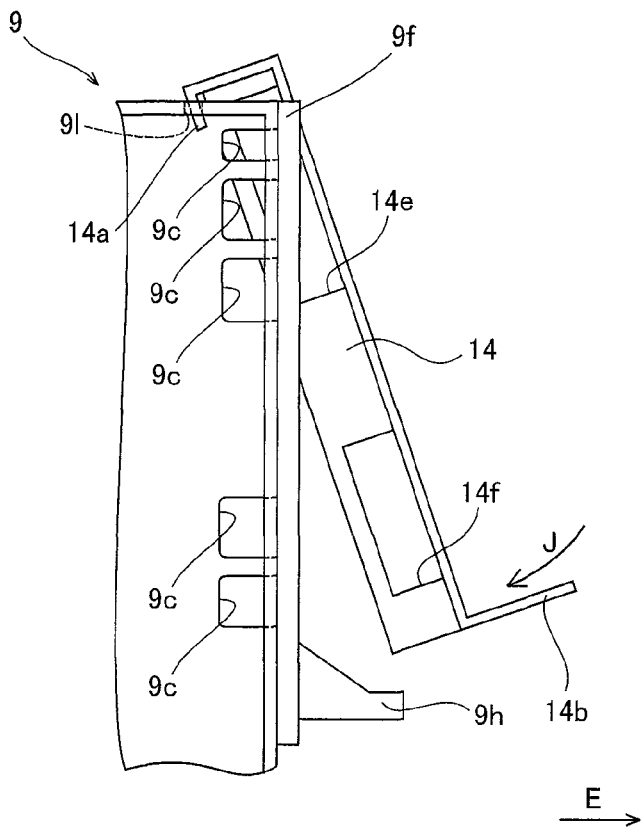
FIGS. 9 and 10 are side elevational views for illustrating steps of mounting the holding plate on the lamp case in the projector according to the embodiment of the present invention shown in FIG. 1.
Figure 10:
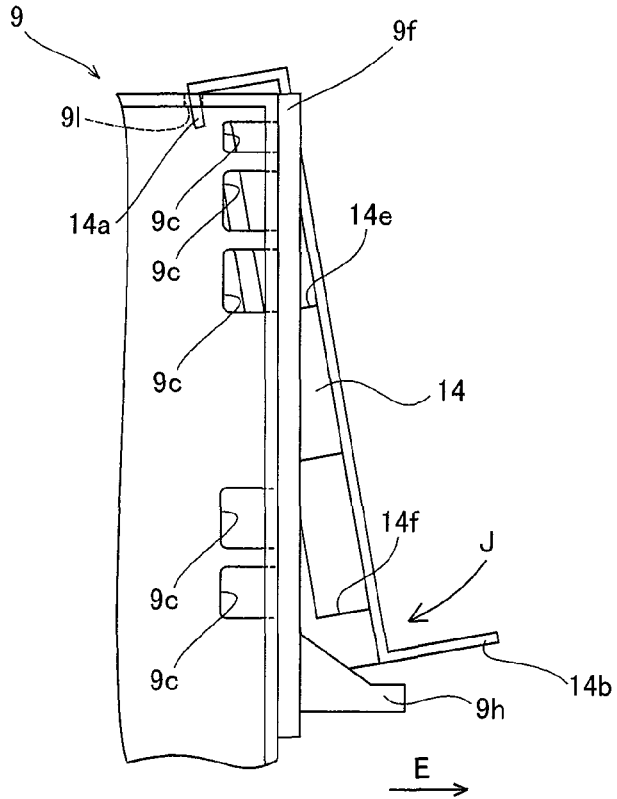

First, the double-faced adhesive tapes 13a, 13b and 13c are stuck to the sides of the discharge guide ports 9c along arrows A, B and C respectively, as shown in FIG. 6. Then, the net member 12 is stuck to the double-faced adhesive tapes 13a, 13b and 13c, to cover the plurality of discharge guide ports 9c. Thereafter the engaging portion 14a of the holding plate 14 is engaged with the engaging hole 91 formed on the upper surface 9k of the lamp case 9, as shown in FIG. 9. Then, the holding plate 14 is rotated about the engaging portion 14a along arrow J, as shown in FIG. 10. In this rotation, the holding plate 14 is guided by the protrusions 9f and 9g, as shown in FIGS. 4 and 10. Then, the holding plate 14 is arranged between the protrusions 9f and 9g of the lamp case 9, as shown in FIG. 3. At this time, the lower mounting portion 14b is arranged on the plate supporting portion 9h of the lamp case 9, as shown in FIG. 5. Then, the holding plate 14 is fixed to the lamp case 9 and the lower frame 4 through the boss 4e of the lower frame 4 and the screw 15. Thus, the net member 12 and the holding plate 14 are completely mounted on the lamp case 9.

According to this embodiment, as hereinabove described, the net member 12 for inhibiting the fragments of the source lamp 11 from being discharged outward from the lamp case 9 through the discharge guide ports 9c when the source lamp 11 is broken is so arranged as to cover the sides of the discharge guide ports 9c of the lamp case 9 closer to the outer side surface 9d and the inclining outer side surface 9e so that the net member 12 can be mounted from the outer side of the lamp case 9 dissimilarly to a case of arranging the net member 12 to cover the inner sides of the discharge guide ports 9c of the lamp case 9, whereby the assembling workability for mounting the net member 12 can be improved. Further, the protrusions 9f and 9g having the function of inhibiting the fragments of the source lamp 11 from passing through the clearance 30 between the lamp case 9 and the net member 12 are so provided on the outer side surface 9d and the inclining side surface 9e in the vicinity of the discharge guide ports 9c of the lamp case 9 as to protrude in the direction (along arrow E) perpendicular to the extensional directions (along arrows A, B, C and D) of the net member 12 so that the fragments of the source lamp 11 can collide with the protrusions 9f and 9g protruding in the direction (along arrow E) perpendicular to the extensional directions (along arrows A, B, C and D) of the net member 12 even if the fragments of the source lamp 11 pass through the clearance 30 between the outer side surface 9d and the inclining outer side surface 9e of the lamp case 9 and the net member 12 when the source lamp 11 is broken while the clearance 30 is formed between the outer side surface 9d and the inclining outer side surface 9e of the lamp case 9 and the net member 12, whereby the scattering fragments of the source lamp 11 are reduced in force. Thus, the fragments of the source lamp 11 can be inhibited from scattering outward from the lamp case 9.

According to this embodiment, as hereinabove described, the holding plate 14 is so mounted on the position corresponding to the discharge guide ports 9c of the lamp case 9 as to hold the net member 12 between the same and the outer side surface 9d and the inclining outer side surface 9e of the lamp case 9 so that the holding plate 14 can hold the net member 12 to press the same against the outer side surface 9d and the inclining outer side surface 9e of the lamp case 9, thereby inhibiting the net member 12 from slipping off the outer side surface 9d and the inclining outer side surface 9e of the lamp case 9.

According to this embodiment, as hereinabove described, the lamp case 9 is provided with the engaging hole 91 engaging with the engaging portion 14a of the holding plate 14, whereby the holding plate 14 can be easily mounted on a prescribed position of the lamp case 9.

According to this embodiment, as hereinabove described, the protrusions 9f and 9g are so provided as to hold both sides (along arrows A and B) of the holding plate 14 and to function as the guides for mounting the holding plate 14, whereby the holding plate 14 can be easily mounted on prescribed positions of the outer side surface 9d and the inclining outer side surface 9e of the lamp case 9.

According to this embodiment, as hereinabove described, the protrusion 9g is so provided as to incline toward the holding plate 14 with respect to the inclining outer side surface 9e on the portion of the lamp case 9 where the holding plate 14 is arranged so that the inclining protrusion 9g can cover the portion of the holding member 14 closer to the protrusion 9g, thereby inhibiting the portion of the holding member 14 closer to the protrusion 9g from moving in the direction (along arrow F) for separating from the inclining outer side surface 9e of the lamp case 9. Thus, the net member 12 arranged between the inclining outer side surface 9e of the lamp case 9 and the holding member 14 can be inhibited from moving in the direction (along arrow F) for separating from the inclining outer side surface 9e of the lamp case 9, whereby formation of the clearance 30 between the net member 12 and the inclining outer side surface 9e of the lamp case 9 can be suppressed. Consequently, the fragments of the source lamp 11 can be more inhibited from scattering outward from the lamp case 9 when the source lamp 11 is broken.

According to the aforementioned embodiment, the protrusions 9f and 9g are arranged at least on the region corresponding to the discharge guide ports 9c, whereby the fragments of the source lamp 11 discharged through the discharge guide ports 9c can collide with the protrusions 9f and 9g when the source lamp 11 is broken.

According to the aforementioned embodiment, the net member 12 is fixed to the lamp case 9 with the double-faced adhesive tapes 13a, 13b and 13c so that the net member 12 can be fixed to the lamp case 9 not only with the holding plate 14 but also with the double-faced adhesive tapes 13a, 13b and 13c, whereby formation of a clearance between the net member 12 and the outer side surfaces 9d and 9e of the lamp case 9 can be suppressed.

Although the present invention has been described and illustrated in detail, it is clearly understood that the same is by way of illustration and example only and is not to be taken by way of limitation, the spirit and scope of the present invention being limited only by the terms of the appended claims.

For example, while the protrusions 9f and 9g are so provided as to hold both sides of the holding plate 14 in the aforementioned embodiment, the present invention is not restricted to this but first and second protrusions may alternatively be provided to hold both sides of the holding plate 14, and upper and lower protrusions may be provided on the upper and lower sides of the holding plate 14 respectively.

While the protrusions 9f and 9g are provided on the left and right sides of the discharge guide ports 9c in the aforementioned embodiment, the present invention is not restricted to this but upper and lower protrusions may further be provided on the upper and lower sides of the discharge guide ports 9c respectively, in addition to the protrusions 9f and 9g. In this case, the protrusions 9f and 9g may be integrally provided on the upper and lower protrusions.

While the engaging portion 14a of the holding plate 14 engages with the engaging hole 91 of the lamp case 9 in order to inhibit the holding plate 14 from moving with respect to the lamp case 9 in the aforementioned embodiment, the present invention is not restricted to this but the lamp case 9 and the holding plate 14 may alternatively be provided with a boss and a receiving hole receiving the boss respectively so that the boss is inserted into the receiving hole, or the holding plate 14 and the lamp case 9 may further alternatively be fixed to each other with a screw or the like.

While only the protrusion 9g is so formed as to incline toward the holding plate 14 with respect to the inclining outer side surface 9e in the aforementioned embodiment, the present invention is not restricted to this but the protrusion 9f may also be so formed as to incline toward the holding plate 14 with respect to the outer side surface 9d.

What is claimed is:

1. A projector comprising:
a source lamp;
a lamp storage portion, storing said source lamp therein, including an air discharge opening for discharging internal air from said lamp storage portion; and
a netlike member, so arranged as to cover the outer side of said air discharge opening of said lamp storage portion, having a function of passing air therethrough and inhibiting fragments of said source lamp from being discharged outward from said lamp storage portion through said air discharge opening when said source lamp is broken, wherein
said lamp storage portion further includes a protrusion provided on the outer side surface of said lamp storage portion close to said air discharge opening to protrude in an outer side direction intersecting with the extensional direction of said netlike member with a function of inhibiting said fragments of said source lamp from passing through a clearance between said lamp storage portion and said netlike member.

2. The projector according to claim 1, wherein
said protrusion is formed at least on a region corresponding to said air discharge opening.

3. The projector according to claim 1, further comprising a holding member mounted on a position corresponding to said air discharge opening of said lamp storage portion to hold said netlike member between the same and the outer side surface of said lamp storage portion.

4. The projector according to claim 3, wherein
said holding member includes an engaging portion, and
said lamp storage portion further includes an engaging hole engaging with
said engaging portion of said holding member.

5. The projector according to claim 3, wherein
said protrusion is so provided as to hold both sides of said holding member and to function as a guide for mounting said holding member.

6. The projector according to claim 3, wherein
a plurality of said protrusions are provided, and
at least one of said plurality of protrusions is so provided as to incline toward the outer side surface of a portion of said lamp storage portion where said holding member is arranged.

7. The projector according to claim 3, wherein
said holding member further includes an opening provided on a position corresponding to said air discharge opening of said lamp storage portion.

8. The projector according to claim 3, wherein
said lamp storage portion further includes a supporting portion provided on the outer side surface close to said air discharge opening to protrude in a direction intersecting with the extensional direction of said netlike member, and
said holding member further includes a mounting portion formed on a position corresponding to said supporting portion of said lamp storage portion.

9. The projector according to claim 8, further comprising a boss so provided as to protrude from the projector body, wherein
said supporting portion of said lamp storage portion has a pair of first mounting holes, and
said mounting portion of said holding member has a pair of second mounting holes formed on positions corresponding to said pair of first mounting holes respectively,
so that said boss is inserted into at least one of said pair of first mounting holes of said lamp storage portion and said second mounting hole formed on the position corresponding to said at least one of said pair of first mounting holes.

10. The projector according to claim 1, wherein
said netlike member is fixed to said lamp storage portion with a double-faced adhesive tape.

11. A projector comprising:
a source lamp;
a lamp storage portion, storing said source lamp therein, including an air discharge opening for discharging internal air from said lamp storage portion;
a netlike member, so arranged as to cover the outer side of said air discharge opening of said lamp storage portion, having a function of passing air therethrough and inhibiting fragments of said source lamp from being discharged outward from said lamp storage portion through said air discharge opening when said source lamp is broken; and
a holding member, mounted on a position corresponding to said air discharge opening of said lamp storage portion to hold said netlike member between the same and the outer side surface of said lamp storage portion, including an engaging portion, wherein
said lamp storage portion further includes:
a plurality of protrusions provided on the outer side surface of said lamp storage portion close to said air discharge opening to protrude in an outer side direction intersecting with the extensional direction of said netlike member with a function of inhibiting said fragments of said source lamp from passing through a clearance between said lamp storage portion and said netlike member, and
an engaging hole engaging with said engaging portion of said holding member,
said plurality of protrusions are so provided as to hold both sides of said holding member and to function as guides for mounting said holding member, and
at least one of said plurality of protrusions is so provided as to incline toward said holding member with respect to the outer side surface of a portion of said lamp storage portion where said holding member is arranged.

12. The projector according to claim 11, wherein
said protrusions are formed at least on a region corresponding to said air discharge opening.

13. The projector according to claim 11, wherein
said holding member further includes an opening provided on a position corresponding to said air discharge opening of said lamp storage portion.

14. The projector according to claim 11, wherein said lamp storage portion further includes a supporting portion provided on the outer side surface close to said air discharge opening to protrude in a direction intersecting with the extensional direction of said netlike member, and
said holding member further includes a mounting portion formed on a position corresponding to said supporting portion of said lamp storage portion.

15. The projector according to claim 14, further comprising a boss so provided as to protrude from the projector body, wherein
said supporting portion of said lamp storage portion has a pair of first mounting holes, and
said mounting portion of said holding member has a pair of second mounting holes formed on positions corresponding to said pair of first mounting holes respectively, so that said boss is inserted into at least one of said pair of first mounting holes of said lamp storage portion and said second mounting hole formed on the position corresponding to said at least one of said pair of first mounting holes.

16. The projector according to claim 11, wherein said netlike member is fixed to said lamp storage portion with a double-faced adhesive tape.

* * * * *